United States Patent
Kay et al.

(10) Patent No.: US 9,274,913 B2
(45) Date of Patent: Mar. 1, 2016

(54) EVENT PAGES FOR WEB APPLICATIONS AND EXTENSIONS

(75) Inventors: Erik Kay, Belmont, CA (US); Mihai Parparita, Mountain View, CA (US); Tessa MacDuff, San Francisco, CA (US); Aaron Boodman, San Francisco, CA (US); Matthew Perry, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/415,475

(22) Filed: Mar. 8, 2012

(65) Prior Publication Data

US 2015/0222512 A1 Aug. 6, 2015

(51) Int. Cl.
*G06F 15/16* (2006.01)
*G06F 3/048* (2013.01)
*G06F 9/44* (2006.01)
*G06F 15/173* (2006.01)
*G06F 17/30* (2006.01)
*G06F 11/30* (2006.01)
*H04L 29/08* (2006.01)

(52) U.S. Cl.
CPC .......... *G06F 11/30* (2013.01); *G06F 17/30899* (2013.01); *G06F 17/3089* (2013.01); *G06F 17/30861* (2013.01); *H04L 67/02* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,539,422 B1* | 3/2003 | Hunt et al. ............ 709/217 | |
| 6,907,546 B1* | 6/2005 | Haswell et al. ........ 714/38.11 | |
| 7,665,075 B1* | 2/2010 | Daynes et al. ............ 717/148 | |
| 7,895,296 B1* | 2/2011 | Dayan ............ G06F 21/53 709/217 | |
| 8,200,962 B1* | 6/2012 | Boodman ............ G06F 21/53 713/161 | |
| 8,392,877 B1* | 3/2013 | Chiluvuri ............ G06F 9/44 717/106 | |
| 8,539,073 B1* | 9/2013 | Dayan ............ G06F 3/048 709/225 | |
| 8,612,547 B1* | 12/2013 | Dayan ............ G06F 9/455 709/219 | |
| 8,850,354 B1* | 9/2014 | Titov ............ 345/156 | |
| 2002/0178353 A1* | 11/2002 | Graham ............ 713/151 | |
| 2002/0194388 A1* | 12/2002 | Boloker et al. ............ 709/310 | |
| 2003/0081002 A1* | 5/2003 | De Vorchik ............ G06F 9/4446 715/762 | |
| 2004/0210630 A1* | 10/2004 | Simonnet et al. ............ 709/203 | |
| 2006/0059477 A1* | 3/2006 | Harscoet ............ 717/166 | |
| 2006/0168101 A1* | 7/2006 | Mikhailov et al. ............ 709/217 | |
| 2006/0288105 A1* | 12/2006 | Britt et al. ............ 709/227 | |
| 2008/0005729 A1* | 1/2008 | Harvey et al. ............ 717/155 | |
| 2008/0127158 A1* | 5/2008 | Carlos ............ 717/168 | |
| 2008/0147671 A1* | 6/2008 | Simon et al. ............ 707/10 | |
| 2009/0164564 A1* | 6/2009 | Willis ............ 709/203 | |
| 2009/0313337 A1* | 12/2009 | Jin et al. ............ 709/206 | |
| 2010/0005169 A1* | 1/2010 | Von Hilgers ............ 709/224 | |
| 2010/0205523 A1* | 8/2010 | Lehota ............ G06F 17/30905 715/235 | |
| 2011/0055314 A1* | 3/2011 | Rosenstein et al. ............ 709/203 | |
| 2011/0055683 A1* | 3/2011 | Jiang ............ 715/234 | |

(Continued)

*Primary Examiner* — Ario Etienne
*Assistant Examiner* — Ho Shiu
(74) *Attorney, Agent, or Firm* — Brake Hughes Bellermann LLP

(57) ABSTRACT

A method and system for monitoring events related to web browser extensions includes storing a set of events for which a browser extension integrated in a web browser application registers a listener. The browser extension integrated in the web browser application is executed. Upon the occurrence of an event related to the browser extension, an invisible event page associated with the browser extension is loaded if the event is one of the set of events. Using the invisible event page, a function related to a visible object of the browser extension is executed. The invisible event page is unloaded from the browser after receiving an acknowledgement from the browser extension.

20 Claims, 8 Drawing Sheets

(56) References Cited

U.S. PATENT DOCUMENTS

| | | | |
|---|---|---|---|
| 2011/0066982 A1* | 3/2011 | Paulsami et al. | 715/835 |
| 2011/0185287 A1* | 7/2011 | Dharmarajan | G06F 17/30902 |
| | | | 715/752 |
| 2011/0320880 A1* | 12/2011 | Wenig et al. | 714/39 |
| 2013/0036108 A1* | 2/2013 | Corbeau | 707/722 |
| 2013/0054686 A1* | 2/2013 | Hassman et al. | 709/204 |
| 2013/0073601 A1* | 3/2013 | Jenkins | G06F 9/547 |
| | | | 709/201 |
| 2013/0144928 A1* | 6/2013 | Gittelman et al. | 709/201 |
| 2013/0191435 A1* | 7/2013 | Gittelman et al. | 709/201 |

* cited by examiner

```
chrome.browserAction.onClicked.addListener(function() {
    chrome.tabs.create({url: "about:blank"}, function(tab) {
        chrome.tabs.update(tab.id, {url: "http://google.com"});
    });
});
```

500 var globals = chrome.extension.localStorage;  //~510 chrome.extension.onInstalled(function() {
    globals.enabled = false;  //~520
});
chrome.browserAction.onClicked.addListener(function() {
    globals.enabled = !globals.enabled;
    resetListeners();  //~530
});

function onBookmarkCreated() {
    alert("You added a bookmark.");
});

function resetListeners() {
    if (globals.enabled) {
        //~540
        chrome.bookmarks.onCreated.addListener(onBookmarkCreated);
    } else {
        //~550
        chrome.bookmarks.onCreated.removeListener(onBookmarkCreated);
    }
} resetListeners();  //~560

FIG. 5

EVENT PAGES FOR WEB APPLICATIONS AND EXTENSIONS

TECHNICAL FIELD

This description generally relates to events associated with web browsers.

BACKGROUND

Browsers typically enable users to interact with and experience many different types of content, usually over a computer network, and often in a visual or graphical manner. For example, users may install one or more internet browsers on a local computing device, and may thereafter utilize the internet browser to access content and/or functionality provided by a remote computing device.

Current internet browsers process many events, some generated by a user, and some generated by the browser itself, other applications, or the operating system. Events can be handled by the browser or by components of the browser. Background pages may spend time idle, wasting memory. Accordingly, there exists a need for a page that is loaded only when needed.

SUMMARY

An event page may include a background page that is loaded only when it needs to do something, and unloaded when idle. Event pages may therefore reduce the total number of web browser extension processes running on a user's system at a given time.

According to one general aspect, a method for monitoring events related to web browser extensions includes storing a set of events for which a browser extension integrated in a web browser application registers a listener. The browser extension integrated in the web browser application is executed. Upon the occurrence of an event related to the browser extension, an invisible event page associated with the browser extension is loaded if the event is one of the set of events. Using the invisible event page, a function related to a visible object of the browser extension is executed. The invisible event page is unloaded from the browser application after receiving an acknowledgement from the browser extension.

According to another general aspect, a system for monitoring events related to web browser extensions may include a memory and a processing device operably connected to the memory and configured to execute code to: store a set of events for which a browser extension integrated in a web browser application registers a listener; execute the browser extension integrated in the web browser application; upon the occurrence of an event related to the browser extension, load an invisible event page associated with the browser extension if the event is one of the set of events; using the invisible event page, execute a function related to a visible object of the browser extension; and unload the invisible event page after receiving an acknowledgement from the browser extension.

The details of one or more implementations are set forth in the accompanying drawings and the description below. Other features will be apparent from the description and drawings, and from the claims.

BRIEF DESCRIPTION OF THE DRAWINGS

FIG. 4 is a file containing an example code snippet.

FIG. 5 is a file containing an example code snippet.

Like reference symbols in the various drawings indicate like elements.

DETAILED DESCRIPTION

Figure 1A:
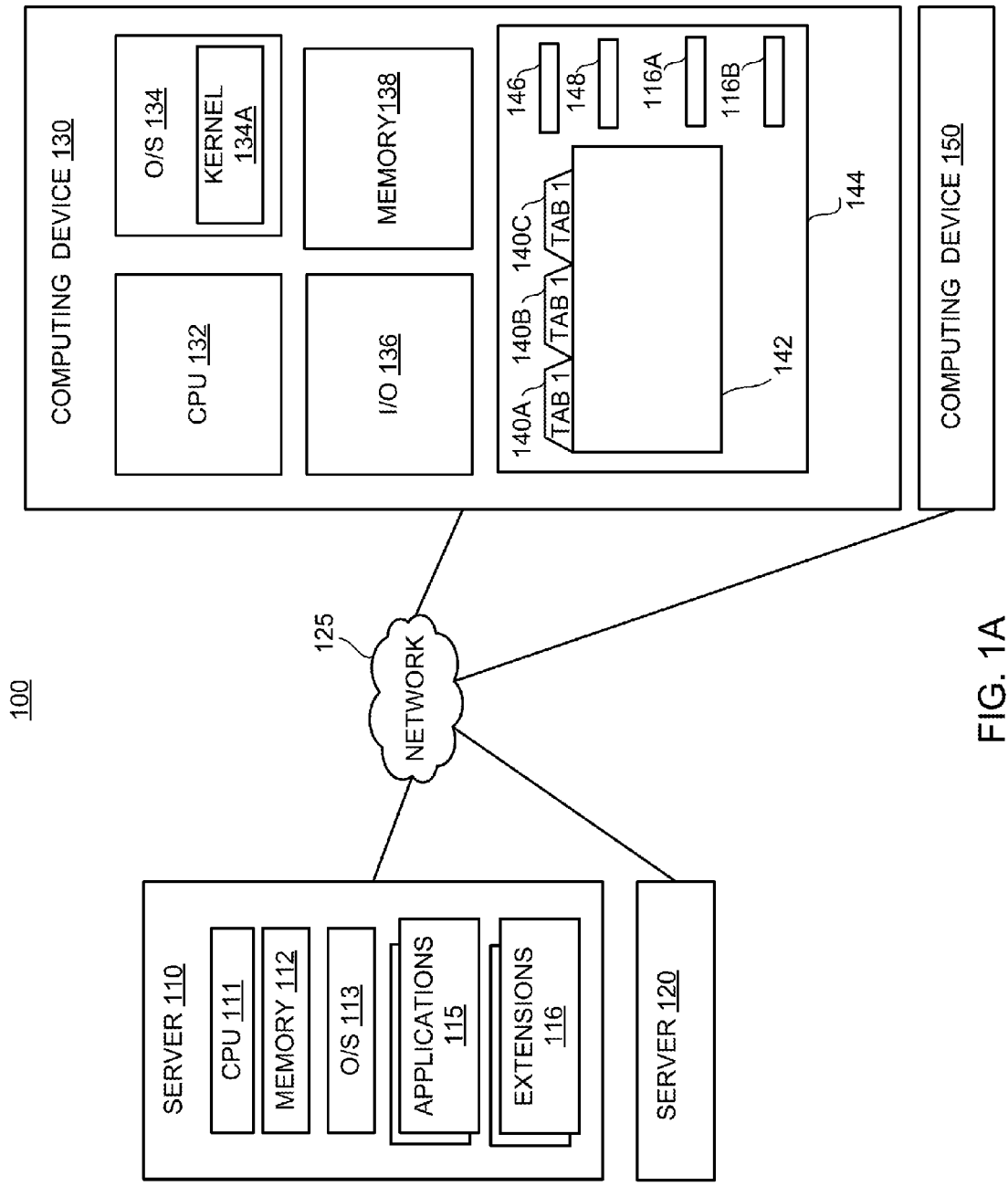
FIG. 1A is an example schematic of a system configured to provide event pages.

This document describes systems and techniques that relate to event pages for web applications or browser extensions installed in a browser application. An event page may serve as a replacement for a background page. Background pages are pages that currently spend a lot of time idle, wasting memory. An event page may be thought of as a background page that is loaded only when it needs to do something, and unloaded when idle. Overall, this may reduce the total number of extension processes running on a user's system at a given time.

Background Page

A "background page" as discussed herein, enables a web application or browser extension to run as soon as a user logs into a computer, including before the user launches a web application or browser extension in the browser application. The background page is an invisible element in a browser application where the background page includes a declared association with an installed web application or browser extension associated with the browser application or with a user account of the browser application. The terms "background page" and "background element" be used interchangeably to mean the same thing throughout this disclosure.

In some implementations, the background page continues to run and execute code even when a web application, browser extension, and/or the browser application have no visible windows. In this manner, the background page is a persistent element even when the web application, browser extension, and/or the browser application associated with the background page is closed.

Event Page

In contrast to a background page, an "event page" is an invisible web element or web page in a browser application, which is loaded in the browser application when needed and unloaded when idle. An event page does not continue to run and execute code at all times. Thus, an event page may save more resources than a background page. An event page may also include a declared association with an installed web application or browser extension that is associated the browser application or with a user account of the browser application.

Thus, unlike a background page that continues to run and execute code even when a web application, browser extension, and/or the browser application have no visible windows, and event page may not continue to run or execute code when a web application, browser extension or browser application have no visible windows. In this manner, the event page is not persistent when the web application, browser extension, and/ or the browser application associated with the background page is closed. Therefore, event pages may save memory.

In some implementations, however, the event page may persist even when the browser has no tabs or windows open, such as when a background process associated with the browser application is still running. In such an implementation, if an event occurs during the time that the browser has no tabs or windows open but when a background process associated with the browser application is still running, the event page may still be loaded to handle the event.

An event page may otherwise perform all the same actions that a background page may perform, as discussed in more detail below with respect to FIG. 1A.

Web Applications and Browser Extensions

Throughout this document, a web application, browser application, or an installed application may refer to a number of different types of applications that are installed in a browser application. Throughout this document, the terms browser and browser application may be used interchangeably to mean the same thing.

In one example, the application may refer to an extension application. Throughout this document, the terms extension application, web extension, web extension application, extension app and extension may be used interchangeably to refer to the same thing. An extension application may be a zipped bundle of files that adds functionality to a browser application. Extension applications may be webpages and may use all of the application programming interfaces (APIs) that the browser application provides to webpages. The extension application may include hypertext mark-up language (HTML), cascading style sheets (CSS), JavaScript, images, and other types of files and web-related computer languages and code.

In one exemplary implementation, the background element of an extension application is an invisible element that includes the main logic or instructions related to the extension application. In this manner, the background element may function as a central hub for the functionality of the extension application. The background element is associated with one or more visible elements of the extension application. Upon the launch or a triggering event such as logging into a computer or launching the browser application or launching the extension application, the background element launches and begins executing the instructions contained within the background element. In this manner, the extension application provides quick and fast access to content due to the fact that the background element is operating even when the visible elements of the extension are not being displayed. Upon invocation of a visible element of the extension, the background element provides content and information that has been collected in the background.

In another example, the application may be an installed web application. Throughout this document the terms web application and web app may be used interchangeably to refer to the same thing. A web application may be a normal website that includes extra metadata that is installed as part of a browser application. Installable web apps may use standard web technologies for server-side and client-side code. The extra metadata associated with the installable web application affects the web application's interaction with the browser application. The web application also may be associated with a background element that is an invisible element in the browser application that includes instructions related to one or more visible elements of the web application in the browser application. Upon the triggering of an event such as launching the browser application or opening the web application, the background element may execute the instructions on its page to perform functions related to the one or more visible elements of the installed web application.

Background elements may be used to include additional functionality related to the declared association with either the web application or the extension application or other types of applications installed in the browser application. For example, the background feature may be used to provide notifications, to download data from a server in the background, to upload data to a server, to prepare the user interface, to play audio, and to perform computations.

In one exemplary implementation, the application associated with the background element may declare its association as part of the extra metadata associated with the application. For example, the extra metadata may be defined in a file, which also may be referred to as a manifest or a manifest file. The background feature information may be included as part of the manifest file. In one example, specific permission may be declared in the manifest file such that the user is notified of the background element's existence prior to the installation of the application in the browser application. In this manner, the user is explicitly notified that an invisible background element exists and may be performing functions in the background even when no visible elements related to the installed application are being displayed. The installation of the application may be an implicit grant of permission by the user to use the background element in this manner. Should the user no longer desire to allow the background permission, the user may revoke the background permission by uninstalling the application from the browser application.

In one exemplary implementation, an event page may be a background webpage that is unloaded when idle. The background webpage, as described above, is not a visible webpage but instead is an invisible webpage that provides functionality to one or more of the visible elements related to the application. In another exemplary implement, the event page may be a background window that is also an invisible window that includes instructions related to one or more of the visible elements of the application. The event page, in contrast to the background page, is unloaded when idle.

FIG. 1A illustrates a system configured to provide event pages. System 100 includes servers 110 and 120, operably connected to each other and to computing devices 130 and 150 via a network 125. Network 125 may be any type of network, such as the Internet. Network 125 may be implemented through a direct communication link, a local area network (LAN), a wide area network (WAN) and/or other suitable connections. Server 110 includes a central processing unit (CPU) 111, memory 112, operating system (O/S 113), applications 115, and extensions 116. Server 110 may also host various APIs that are asynchronous.

Computing device 130 includes CPU 132, I/O 136, memory 138, and O/S 134. O/S 134 may include kernel 134A. Computing device 130 is discussed in more detail below with respect to FIG. 2.

Computing device 130 may also include browser application 144, which includes browser interface 142, including tabs 140A, 140B, and 140C. Browser application 144 may execute browser extension 116A. Tabs 140A, 140B, and 140C may execute separate processes, as described in more detail below with respect to FIG. 1B. In some implementations, browser application 144 operating on computing device 13 may also host various APIs that are asynchronous.

Of course, server 120 and computing device 150 may include similar elements as server 110 and/or computing device 130. The use of two servers and two computing devices is merely for illustration, as any number and any configuration of servers, computing devices, and other computers may be used in system 100. For example, an additional sync server and a digital marketplace server may be utilized in system 100.

A web browser (e.g., browser application 144) executed by computing device 130 can receive code (e.g., HTML code, JavaScript, etc.) from server 110 (e.g., a remote server that hosts a website) and can execute the receive code on the device for the benefit of a user of the computing device 130.

In various implementations, the web browser 144 may include or be associated with one or more web applications (e.g., one or more of applications 115). In this context, a "web application" may be configured to a single task or multiple tasks for a user. In such an implementation, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions (e.g., one of extensions 116). In this context, a "browser extension" may include one or more web pages packaged or grouped together as a definable whole, and configured to extend the functionality to the web browser. Thus, extensions also provide extra functionality to a browser, but generally, unlike web applications, there is little or no user interface component to the functionality provided by a browser extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions cut across websites and web applications. Extensions may be in effect across all websites (though some are site-specific). Web applications may not combine with other applications in this way. Rather, web applications generally run standalone, like any regular website.

Browser application 114 may also include a background page 146, which, as describe above, may be an invisible element such as a webpage that is associated with multiple visible elements, such as visible webpages. The visible elements in this example include tabbed webpages 140A, 140B, and 140C that are visible in browser interface 142 of browser application 144. Browser application 114 may also include an event page 148, which, as describe above, may be an invisible element such as a webpage that is associated with multiple visible elements, such as visible webpages, and which is loaded when needed and unloaded when idle.

In the example depicted in FIG. 1A, the browser application 144 also includes at least two extensions 116A and 116B that are installed. The first extension 116A may be referred to as a browser action and the second extension 116B may be referred to as a page action. The browser action may be associated with each of the visible tabs 140A, 140B, and 140C. The browser action is associated with the background element. The background page 146 and the event page 148 may each be defined by a separate an html file (e.g., background.html) and include JavaScript code that controls the behavior of the browser action in the windows 140A, 140B, and 140C. The background page 146 and the event page 148 may each include instructions that enable the pages 146, 148 to access APIs that the extensions 116A, 116B may have been granted access to. In this manner, the background page 146 or the event page 148 may act as a control hub that includes the logic and instructions to run the extensions 116A, 116B.

Also, the background page 146 or the event page 148 may be allowed to have direct script access to one or all of the views of a page associated with the extension that is running at any given time. The background page 146 or the event page 148 may be enabled to access all of the views and to communicate with them synchronously. The background page 146 or the event page 148 may allow past shared state for all of the views running in the background page 146 or the event page 148. In this manner, the background page 146 or the event page 148 may include cached logic. The other pages, whether visible or invisible, may get state information updated from the background page 146 or the event page 148.

Figure 1B:
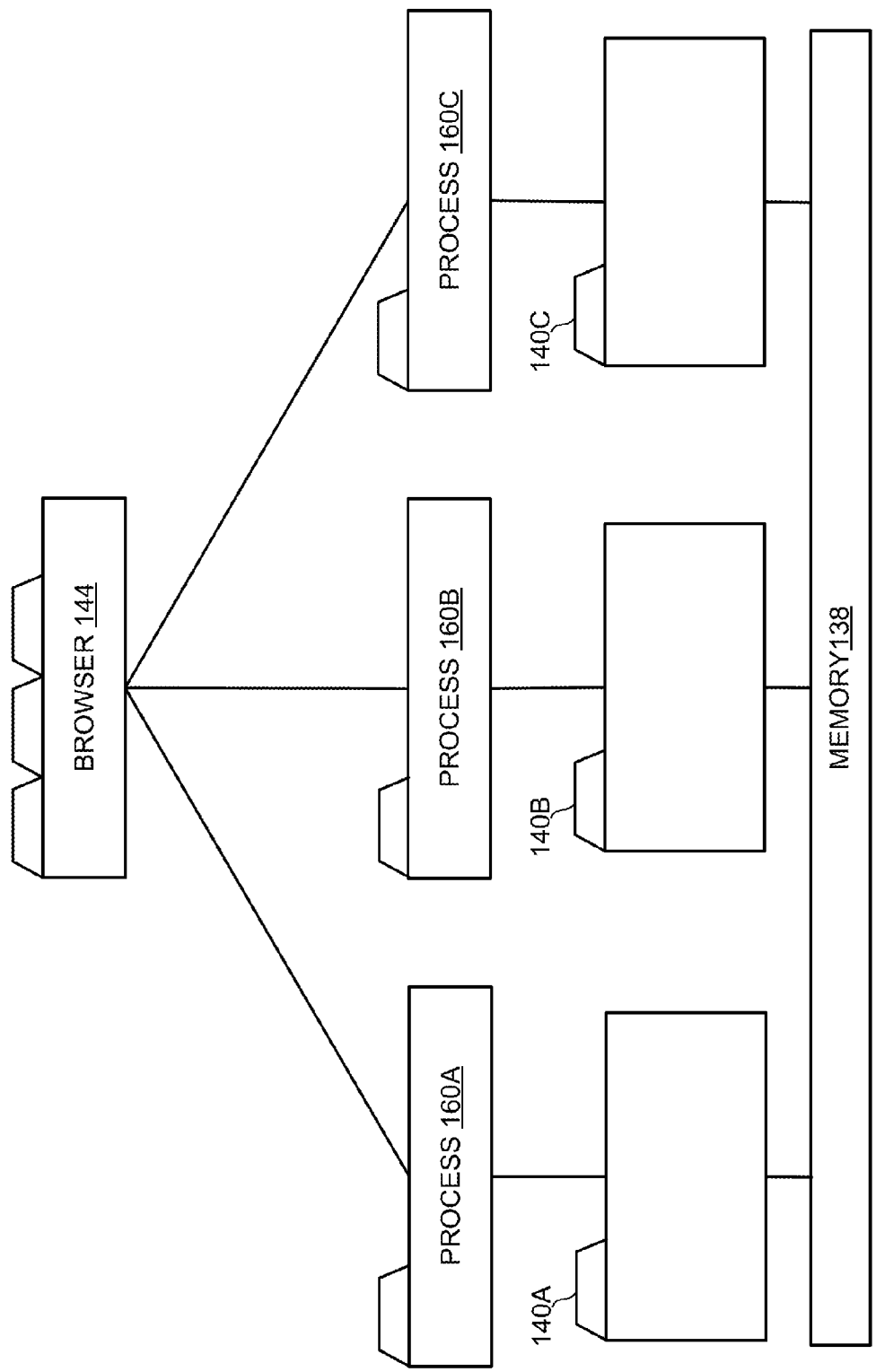
FIG. 1B is an example block diagram of a browser process configuration.

In one exemplary implementation, the background page 146 or the event page 148 may be configured to perform as a central hub for receiving messages from content scripts or from other extensions (e.g., any of extensions 116 or other extensions associated with browser application 144). For example, the other pages associated with extension 116A or 116B often need to communicate. Because all of an extension's pages may execute in the same process on the same thread (e.g., within the same tab 140A, as shown in FIG. 1B), the pages can make direct function calls to each other. To find pages in the extension, chrome.extension methods and getViews( ) and getBackgroundPage( ) may be used. Once a page has a reference to other pages within the extension, the first page may invoke functions on the other pages, and it may manipulate their document object models (DOMs).

The extensions 116A, 116B may use a content script to interact with other pages. For example, a content script may be a script (e.g., JavaScript) that executes in the context of a page that has been loaded into the browser application 144. Content scripts may read details of the web pages that browser application 144 visits and the content scripts may make changes to the web pages. For example, a content script may read and modify the DOM for a displayed web page.

However, the content script may not be able to modify the DOM of its parent extension's background page. Also, a content script may exchange messages with its parent extension. For example, a content script might send a message whenever it finds a Really Simple Syndication (RSS) feed in a browser page. Also, for example, a background page or an event page may send a message asking a content script to change the appearance of its browser page. In these and other examples, the background page 146 or the event page 148 may function as a hub to receive messages from content scripts or from other extensions and to communicate the messages to an appropriate destination or to take action on the received message.

In one exemplary implementation, the background page 146 or the event page 148 may include a cache of all messages. For instance, in an email application, the extension may be related to the email application where the email application includes a visible window with an inbox. The inbox may populate and display quickly because the window itself is not retrieving information from a remote server. Instead, the invisible background page 146 or the event page 148 may pull the information from the remote server and provide the updated information directly to the visible window such that when the inbox window is selected either to open or to bring it into focus, the inbox window may be populated very quickly from the background page 146 or the event page 148.

In another exemplary implementation, a web application such as a newspaper-related application may include a background page 146 or an event page 148 associated with the newspaper application. The background element associated with the newspaper application may be persistent and continue to run even when the newspaper application is closed or not running. The background page may continue to gather and collect information from one or more remote servers such that when the newspaper application is made visible or brought into visible focus, the newspaper application may be updated more quickly by pulling the information from the background page instead of from the remote servers. In this manner, the persistent background element that runs in the background may be used to update content in the background such that when a user desires to make the content visible it is easily and more quickly made accessible.

In one exemplary implementation, the browser application may run all top level pages from an installed application or extension application in the same process. In this manner, only one instance of critical systems related to the application is running at a time. As discussed in more detail below with respect to FIG. 1B, each tab in the browser application may use a separate process to protect the overall browser application from bugs and glitches in a rendering engine associated with the browser application. Access may be restricted from one rendering engine process to other rendering engine processes and to the rest of the system. In this manner, one process running for one application or for one extension is isolated and separate from other processes running for other applications or for other extensions.

FIG. 1B is an exemplary block diagram of a browser process configuration. As shown in FIG. 1B, browser application 144 may execute separate processes 160A, 160B, 160C, which each display separate tabs 140A, 140B, and 140C, respectively. Tabs 140A, 140B, and 140C may execute separate processes that each have read/write access to at least a portion of memory 138. In some implementations, tabs 140A, 140B, and 140C may execute separate processes, each having its own memory and its own copy of global data structures. Separate processes render separate tabs, which may create separate JavaScript threads as well. One tab (e.g., tab 140A) may be busy while all the other tabs are in use. If there is an error in the renderer of one tab, it may not affect the other tabs or crash the entire browser application 144.

Figure 2:
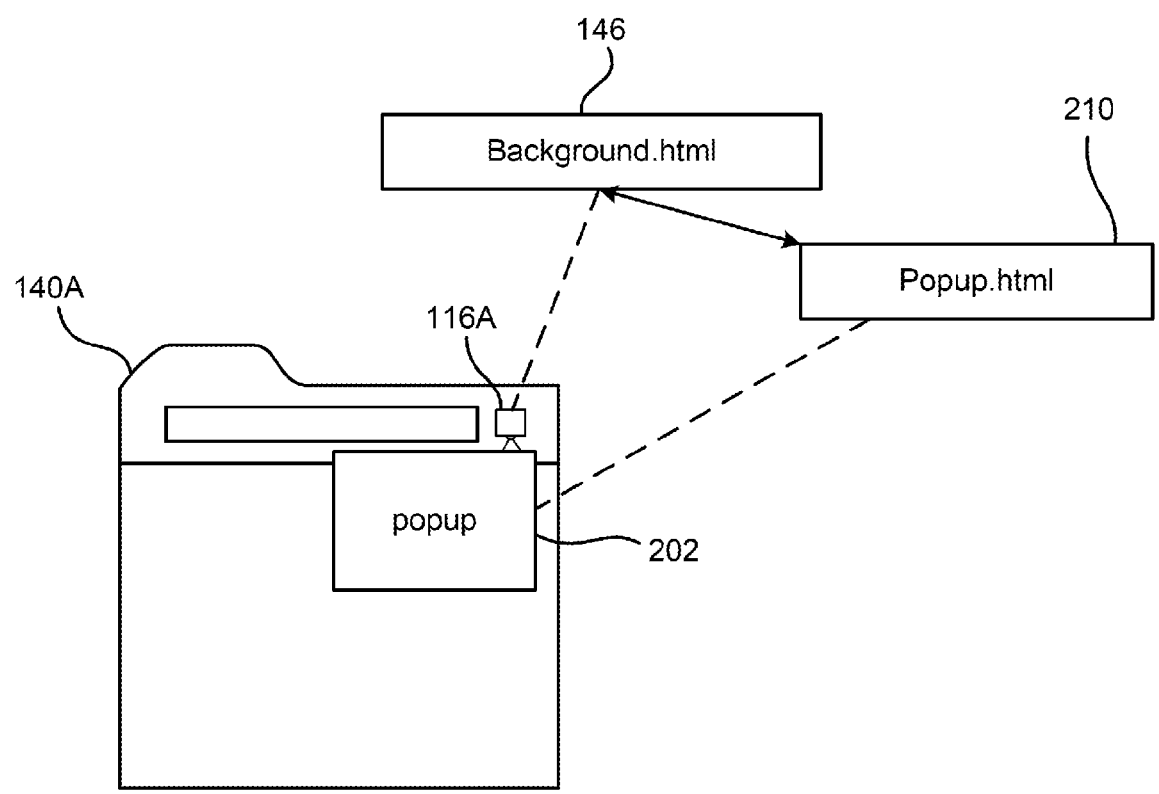
FIG. 2 is a block diagram of a browser interface.

FIG. 2 is a block diagram of a browser interface. The background page 146 is invisible in the browser interface such that a user may not view the contents or the instructions included in the background page 146. Instead, the invisible background page 146 is associated with a visible element of the browser application, e.g., one of tabs 140A. In this example, the window tab 140A is a window in the browser application, which includes an extension 116A that is installed in the browser application 144.

In this example, the extension 116A may be associated with both a background page 146 and a popup page 210. The popup page 210 may be implemented by an HTML file (e.g., popup.html 210). Also, as an example, extensions may use other means and implementations to display HTML files that are part of the extension application. For example, extensions also may use chrome.tabs.create( ) or window.open( ) to display HTML files that are in the extension. The pages (e.g., HTML pages) inside an extension may include complete access to each other's DOM and those pages may invoke functions on each other. The popup page 210 may invoke functions on the background page 146. Similarly, the background page 146 may invoke functions on the popup page 210.

In this example, the popup window 202 that is made visible in the browser tab 140A may be considered a dumb view. The dumb view does not update itself directly from the remote servers (e.g., servers 110, 120). Instead, when the view needs some state, it requests the state from the background page 146. Also, when the background page 146 notices a state change, the background page 146 provides the state information to the popup window without first receiving a request. The background page 146 is always running, in contrast to an event page, as discussed in more detail below with respect to FIG. 3.

As discussed above, a background element, whether it is a background page and/or a background window, may be declared and registered as part of an application or extension (e.g., extension 116A) in the metadata that is associated with the application or extension. Similarly, an event page may be declared and registered as part of an application or extension (e.g., extension 116A) in the metadata that is associated with the application or extension.

Figure 3:
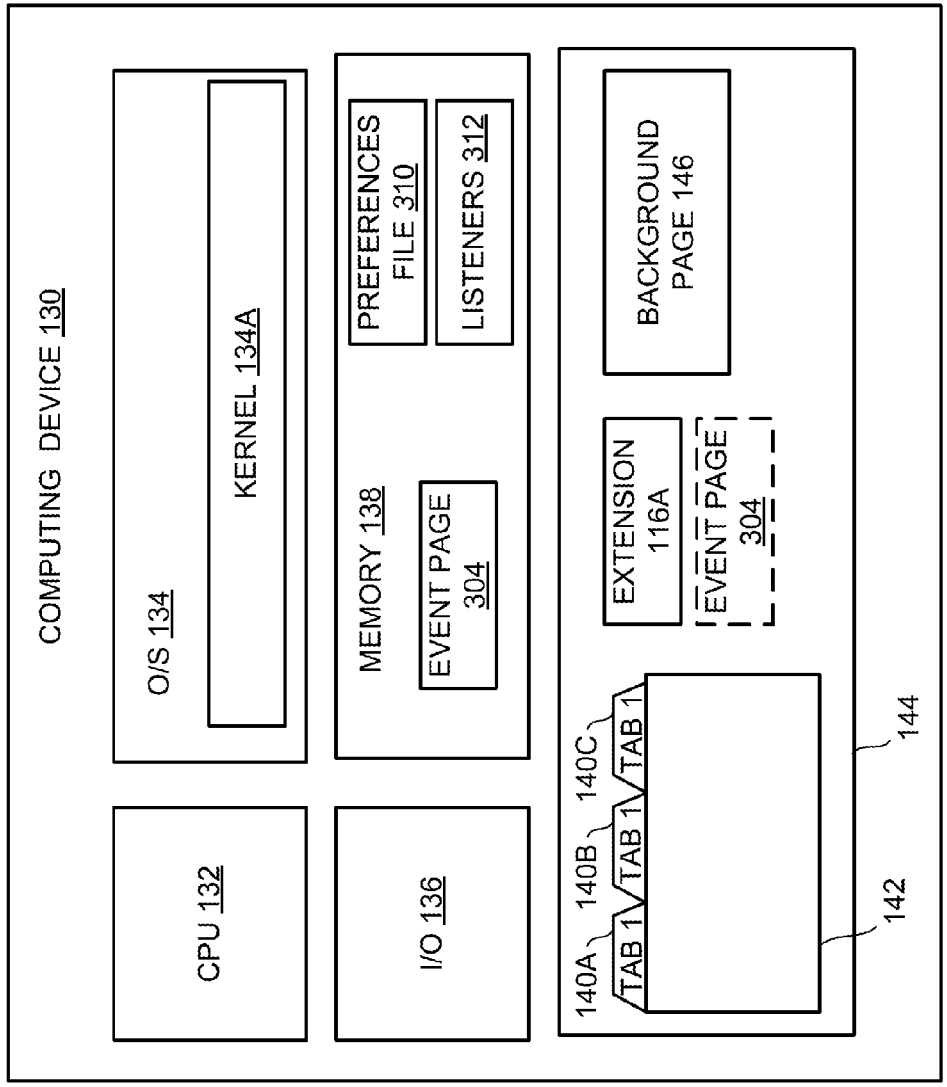
FIG. 3 is a schematic of an example computing device configured to provide event pages.

FIG. 3 is an exemplary schematic of a computing device of a system configured to provide event pages. As shown in FIG. 3, computing device 130 from system 100 includes CPU 132, O/S 134 with Kernel 134A, I/O 136, memory 138, and browser application 144. Browser application 144 also includes extension 116A and background page 146, and may load event page 304 as needed.

Event page 304 is an invisible page that may be loaded by browser application 144 only when needed to perform actions, which may reduce the total number of extension processes running on computing device 130 at a given time. In one exemplary implementation, event page 304 may be loaded when extension 116A is first installed, and computing device 130 may record a set of all events that the extension 116A registers a listener 312 for. The set of events may be stored in preferences file 310, which may be stored in memory 138, so that the set of events persists across browser restarts. The set of events may be cleared when the extension 116A is upgraded, at which time the event page 304 may be loaded again, and the set of events may be recreated at that time.

Whenever an event in the set of events occurs, the browser application 144 may check to see which extensions have listeners (e.g., using listeners file 312) for that event. For those extensions that have listeners for that event, the event page (e.g., event page 304) is loaded in browser application 144, and the event is dispatched. In some implementations, to preserve resources, all event pages for a given event may be loaded in the same process.

To decide when the event page can be unloaded, a "counting" system may be used. The browser application 144 may keep track of the relevant count(s). For example, when an event page's count reaches 0, the browser application 144 knows is safe to unload the page. In some implementations, the page may not be unloaded immediately, but after a delay (e.g., 5 seconds, 10 seconds, 20 seconds, etc.) in case multiple events fire in quick succession.

The following items may affect the "count":

1. An event is dispatched to the event page 204. The event is released when extension 116A responds with an acknowledgement.

2. The event page 204 makes an API call and is waiting for its callback to return a result (e.g., API call chrome.tabs.getCurrent(callback)). This event is released when the callback is dispatched (e.g., by the browser or by a server).

3. The event page 304 starts a resource load (such as an XHR or iframe resource). For example, XMLHttpRequest (XHR) is an API available in web browser scripting languages such as JavaScript. It may be used to implement dynamic web applications, for example to send HTTP or HTTPS requests directly to a server (e.g., server 110 or 120) and load the server response data directly back into the script. The data might be received (e.g., from server 110 or 120) as XML text or plain text. Data from the response can be used directly to alter the DOM of the currently active document in the browser window (e.g., tab 140A) without loading a new web page document. The response data can also be evaluated by client-side scripting (e.g., by computing device 130).

4. The event page 304 has an outstanding database call. This event is released when the call completes.

5. Of course, there are potentially other asynchronous events that require the event page 204 to be notified of the event.

In some implementations, it may be difficult to keep the event page 304 alive for all cases. For example, there might be some event that is difficult or impossible to wait for completion. In such an example, the delay before unloaded the event page could also act as a buffer for reasonable activity to die down. This is in contrast to other ephemeral page models, where the application or extension has a hard time limit to clean up before it is forcibly closed. When the browser 144 wants to unload the extension page, it may send a message to the extension process and wait for an acknowledgement. This is to ensure that all events and callbacks have run before the page is unloaded.

Event Registration and Deregistration

In some implementations, the browser 144 may remember events registered at any point, not just when the extension is installed. The browser may continue to remember the event until the extension explicitly removes each listener, for example, using eventObject.removeListener( ). This supports the case of optional features that can be enabled or disabled at runtime.

This behavior means that the browser 144 may load an event page 304 to handle an event, but the page may decide not to add a listener for that event. If that happens, the event will simply be discarded (e.g., with a warning message).

Chatty Events

Some events fire very frequently during normal usage of the browser—so frequently that an event page might never have idle time in which it can unload. If an extension needs to listen to these events, it will may either use a persistent background page, or handle the events with a declarative listener. APIs that may have chatty events include tabs, cookies, or history APIs. Examples of non-chatty events include pageAction, browserAction, and omnibox (e.g., search bar) APIs.

Forcible Load

One method, such as chrome.extension.setTimeout(timeout, callback), may provides an alternative to window.setTimeout to cause the event page 304 to be loaded if it is not already. In some implementations, this functionality may be included in a window.setTimeout method. In some implementations, this method is not allowed to be called more than once per minute.

Runtime Data

A common use case for persistent background pages is to keep some runtime data in global variables relevant to the current session. This method may not work for event pages, because global state is cleared when browser 144 unloads the event page. An extension can manually use localStorage, document.cookie, or the extension storage API to handle this use case.

An Example

FIG. 4 illustrates a code snippet for a simple event page. Code 400 illustrates an example that opens a tab and then navigates to it when a user clicks or otherwise selects its browser action. This example is similar to a background page with similar functionality, but one difference from a background page is that this event page need not be loaded unless needed, for example unless the browser action is clicked.

In the example of FIG. 4, a process using code 400 may operate as follows:

1. A user installs an extension.

2. The browser starts an extension process and loads eventpage.js.

3. The call to browserAction.onClicked.addListener causes the browser to remember that the extension cares about that event.

4. Once the event page finishes loading, the browser immediately unloads it again.

5. Some time later, the user clicks the extension's browser action.

6. The browser sees that the extension cares about the browserAction.onClicked event, so it loads eventpage.js in an extension process.

7. This time, the call to browserAction.onClicked.addListener simply registers the javascript callback. The browser already knows that browserAction.onClicked is a registered event, so it does not have to persist that again.

8. Once the event page finishes loading, the browser dispatches the onClicked event.

9. The event handler is invoked, triggering an API call to tabs.create( ). This keeps the page alive until its callback runs.

10. The callback runs, triggering another API call to tabs.update( ) This time, the call has no callback, so there is nothing else keeping the page alive.

11. After the timeout, the browser unloads the event page.

A More Complex Example

FIG. 5 illustrates a more complex example, illustrating some differences from regular background pages. This extension has a browser action that starts off in a "disabled" state. When it is clicked, it becomes "enabled", which means it will pop up an alert whenever a user adds a bookmark.

In line 510, the code makes use of the persisted storage object. In line 520, the "enabled" state might normally be a global variable, if this were a persistent background page. However, this event page might be unloaded at any time, so it is stored in the extension storage API instead.

In line 540, the bookmarks.onCreated listener is not created until the user clicks on the browser action (well after the initial page load on extension install). The browser will remember the extension's interest in this event, until it is unregistered in line 550. It does not matter when an event listener is called; the first call may always register the event with the browser's internal list (e.g., within preferences file 310 as described above with respect to FIG. 3). In lines 530 and 560, the event listeners (e.g., listeners 312 as described above with respect to FIG. 3) are updated to match the "enabled" status. Both calls may be necessary, because in line 530, the browserAction.onClicked event is being dispatched, and the browser needs to be notified that the event page is interested in the bookmarks.onCreated event. Otherwise, the browser may not know to notify the user. Additionally, in line 560, the page is being loaded before in preparation for dispatching the bookmarks.onCreated event. In this case, the javascript callback that will handle the event may be registered.

In one example, if the else clause above line 550 were omitted, the browser would think the event page is always interested in the bookmarks.onCreated event. In that example, the user adds a bookmark, the browser would load the event page to dispatch the event, but since localStorage ['enabled'] is "false", the javascript callback is not set up to act as the event listener in line 540. The event would get dropped.

Figure 6:
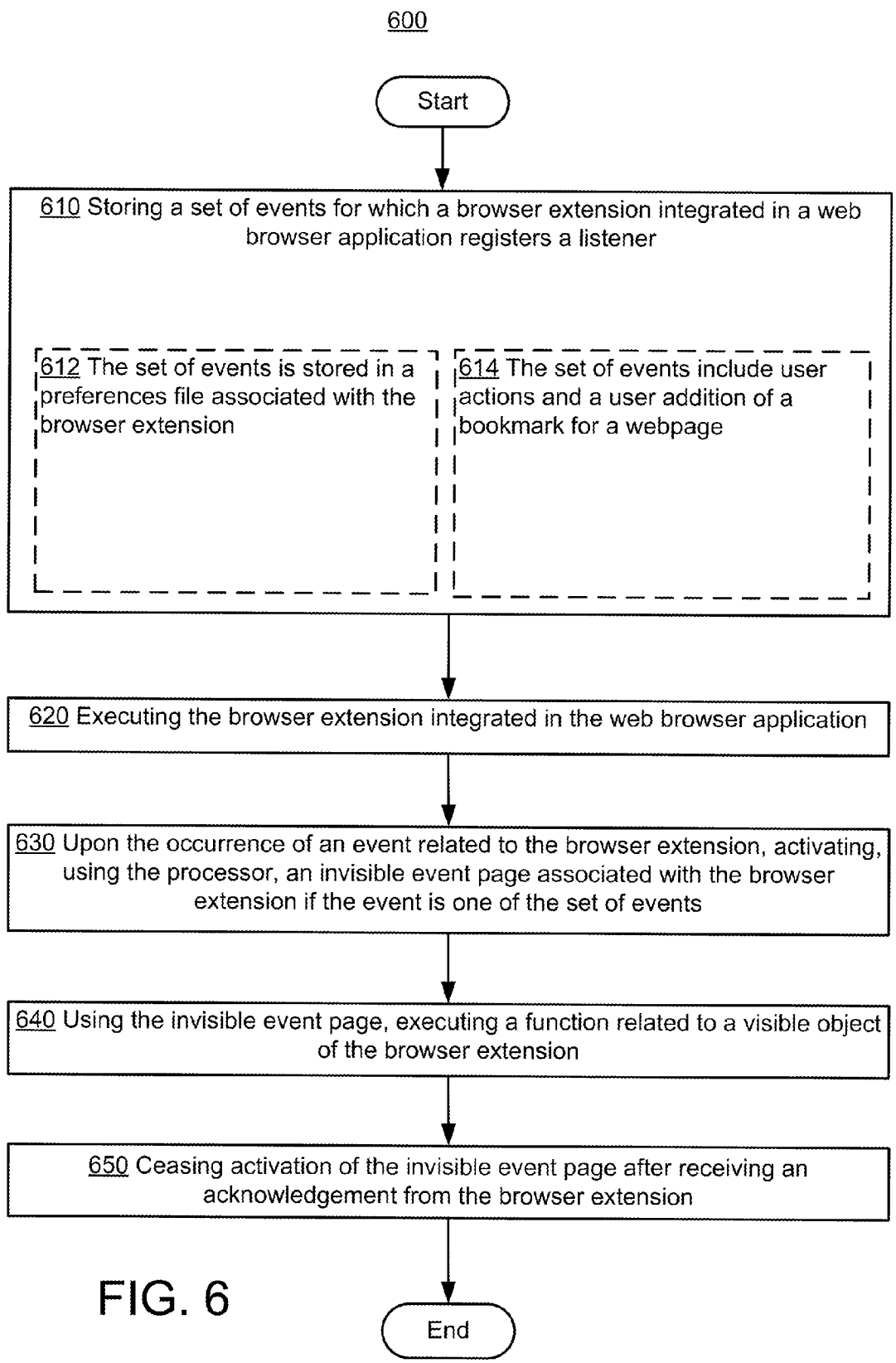
FIG. 6 is a flow diagram illustrating example operations of the system of FIGS. 1A, 1B, and 3.

FIG. 6 is an exemplary flow diagram illustrating example operations of the system of FIGS. 1A, 1B, and 3. The process 600 may be executed at least in part by computing device 130, including browser application 144, which is shown in FIGS. 1A and 3. Process 600 may include storing a set of events for which a browser extension integrated in a web browser application registers a listener (610). In some implementations, the set of events may be stored in a preferences file associated with the browser extension (612). In some implementations, the set of events may include user actions and a user addition of a bookmark for a webpage (614).

The browser extension that is integrated in the browser application is executed (620), for example by the browser application. Upon the occurrence of an event related to the browser extension, a processor (e.g., CPU 111 of the computing device 130) may load an invisible event page (e.g., event page 304) associated with the browser extension (e.g., extension 116A) if the event is one of the set of events (630). Using the invisible event page, a function related to a visible object of the browser extension is executed (640). The visible object may include a window in the browser application, a pop-up window in the browser application, or other notification windows and visible elements associated with the browser application. The visible elements of the application may be associated with a tab in the browser application (e.g., tab 140A shown in FIG. 3). The browser unloads the invisible event page after receiving an acknowledgement from the browser extension (650). In some implementations, the acknowledgement is received after a request from within the browser application, which is invisible to a user. In some implementations, the browser unloads the invisible event page after a certain predefined time period (e.g., 50 seconds).

In one exemplary implementation, executing the instructions on the background element includes collecting information from one or more remote servers (e.g., servers 110 and 120, shown in FIG. 1) and updating state information associated with the invisible elements of the browser extension. In this manner, information may be collected in the background by the event page and the event page may provide the updated state information to a visible webpage either upon request by the visible element or after obtaining the updated information.

In another exemplary implementation, the event page may collect information from one or more remote servers, upload state information associated with the browser extension, and display a notification including the information from the remote servers.

Thus, in contrast to background pages, and rather than waste time memory, event pages may serve to reduce the number of browser extension processes running on a user's system at any given time.

Figure 7:
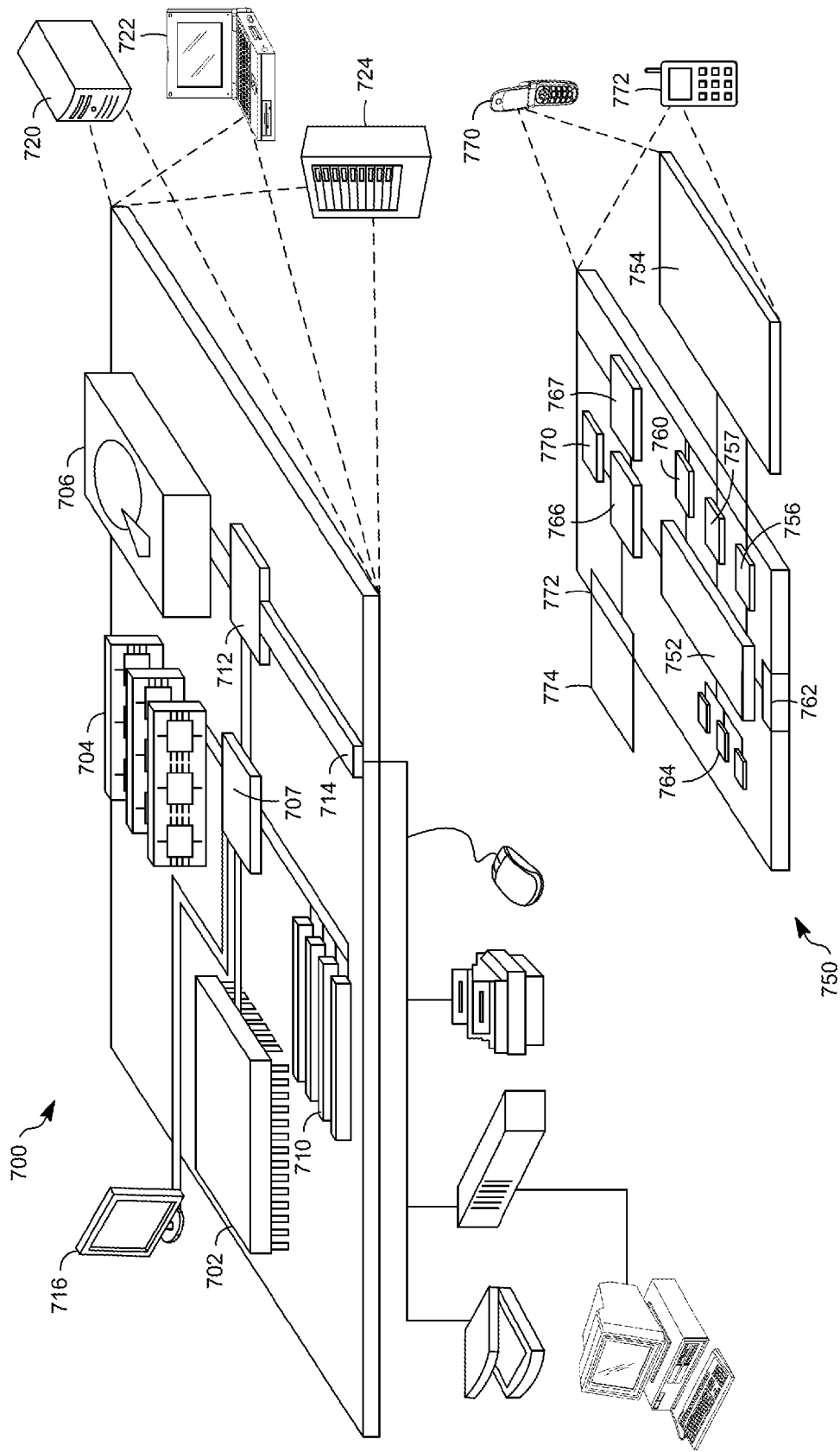
FIG. 7 is a block diagram showing example or representative computing devices and associated elements that may be used to implement systems and methods in accordance with FIGS. 1A, 1B, and 2-6.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made to the implementations described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for monitoring events related to web browser extensions, comprising:
    executing, using a processor of a computing device, a web browser application, wherein the web browser application includes a browser extension, wherein the browser extension adds functionality to the browser application beyond that of the web browser application when the extension is not included;
    storing, in a memory of the computing device, a set of events for which the browser extension that is included in the web browser application registers a listener;
    upon the occurrence of an event included among the set of events for which the browser extension has a registered listener, loading, using the processor, an invisible event page associated with the browser extension;
    using the invisible event page, executing a function related to a visible object of the browser extension; and
    unloading the invisible event page after receiving an acknowledgement from the browser extension that the function has been executed.

2. The computer-implemented method of claim 1, further comprising:
    storing the set of events in a preferences file associated with the browser extension.

3. The computer-implemented method of claim 1, further comprising:
    sending, within the browser application, a request for the acknowledgement to the browser extension.

4. The computer-implemented method of claim 1, wherein the event is a content script request from the browser extension.

5. The computer-implemented method of claim 1, further comprising:
    unloading the invisible event page from the browser application after a predetermined time period.

6. The computer-implemented method of claim 1, further comprising:
    collecting information from a server using the invisible event page.

7. The computer-implemented method of claim 5, wherein executing the function includes displaying a notification related to the collected information in a display of the computing device.

8. The computer-implemented method of claim 6, wherein executing a function related to a visible object of the browser extension includes displaying a pop-up alert in a display of the computing device.

9. The computer-implemented method of claim 1, wherein the event related to the browser extension is a user selection of a browser action.

10. The computer-implemented method of claim 1, wherein the event related to the browser extension is a user addition of a bookmark for a webpage.

11. The computer-implemented method of claim 1, wherein the web browser application continues to store the set of events until the browser extension explicitly removes the listener.

12. The computer implemented method of claim 1, further comprising:
    clearing, using the web browser application, a set of global data when the invisible event page is unloaded.

13. A system for monitoring events related to web browser extensions comprising:
    a memory configured for storing a set of events for which a browser extension that is included in a web browser application registers a listener; and
    a processing device operably connected to the memory and configured to execute code to:
        execute a web browser application, wherein the web browser application includes the browser extension, wherein the browser extension adds functionality to the browser application beyond that of the web browser application when the extension is not included;

upon the occurrence of an event included among the set of events for which the browser extension has a registered listener, load an invisible event page associated with the browser;

using the invisible event page, execute a function related to a visible object of the browser extension; and unload the invisible event page after receiving an acknowledgement from the browser extension that the function has been executed.

14. The system of claim 13, wherein the set of events is stored in a preferences file associated with the browser extension.

15. The system of claim 13, wherein the browser application is configured to send, within the browser application, a request for the acknowledgement to the browser extension.

16. The system of claim 13, wherein the event is a content script request from the browser extension.

17. The system of claim 13, further comprising: unloading the invisible event page from the browser application after a predetermined time period.

18. The system of claim 13, wherein the browser application is configured to collecting information from a server using the invisible event page.

19. The system of claim 13, wherein the function includes a notification related to the collected information and configured to be displayed in a display of the computing device.

20. A non-transitory computer readable medium containing executable code that causes a computing device to:

execute, using a processor of the computing device, a web browser application, wherein the web browser application includes a browser extension that adds functionality to the browser application beyond that of the web browser application when the extension is not included;

store, in a memory of the computing device, a set of events for which the browser extension that is included in the web browser application registers a listener;

upon the occurrence of an event included among the set of events for which the browser extension has a registered listener, load, using the processor, an invisible event page associated with the browser extension;

using the invisible event page, execute a function related to a visible object of the browser extension; and unload the invisible event page after receiving an acknowledgement from the browser extension that the function has been executed.

\* \* \* \* \*